US007694002B2

(12) United States Patent
Vadlakonda et al.

(10) Patent No.: US 7,694,002 B2
(45) Date of Patent: Apr. 6, 2010

(54) SYSTEM AND METHOD FOR DYNAMICALLY UPGRADING / DOWNGRADING A CONFERENCE SESSION

(75) Inventors: Sravan Vadlakonda, Sunnyvale, CA (US); Ashish Chotai, Santa Clara, CA (US); Binh Don Ha, Fremont, CA (US); Aseem Asthana, San Jose, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 398 days.

(21) Appl. No.: 11/399,970

(22) Filed: Apr. 7, 2006

(65) Prior Publication Data

US 2007/0239885 A1   Oct. 11, 2007

(51) Int. Cl.
*G06F 15/16* (2006.01)
(52) U.S. Cl. .................. 709/228; 709/225; 709/226; 709/229; 709/232
(58) Field of Classification Search .................. 709/228, 709/226, 225, 229, 232
See application file for complete search history.

(56) References Cited

U.S. PATENT DOCUMENTS

| | | | |
|---|---|---|---|
| 5,483,587 | A | 1/1996 | Hogan et al. |
| 5,600,366 | A | 2/1997 | Schulman |
| 5,673,253 | A | 9/1997 | Shaffer |
| 5,729,687 | A | 3/1998 | Rothrock et al. |
| 5,917,830 | A | 6/1999 | Chen et al. |
| 5,963,217 | A | 10/1999 | Grayson et al. |
| 6,044,081 | A | 3/2000 | Bell et al. |
| 6,137,834 | A | 10/2000 | Wine et al. |
| 6,141,324 | A | 10/2000 | Abbott et al. |
| 6,236,854 | B1 | 5/2001 | Bradshaw |
| 6,269,107 | B1 | 7/2001 | Jong |
| 6,332,153 | B1 | 12/2001 | Cohen |
| 6,501,739 | B1 | 12/2002 | Cohen |
| 6,505,169 | B1 | 1/2003 | Bhagavath et al. |
| 6,608,820 | B1 | 8/2003 | Bradshaw |
| 6,671,262 | B1 | 12/2003 | Kung et al. |
| 6,675,216 | B1 | 1/2004 | Quatrano et al. |
| 6,718,553 | B2 | 4/2004 | Kenworthy |
| 6,735,572 | B2 | 5/2004 | Landesmann |

(Continued)

FOREIGN PATENT DOCUMENTS

EP    1 553 735 A1    7/2005

OTHER PUBLICATIONS

Handley, et al. SIP: Session Initiation Protocol. RFC 2543. Mar. 1999. Retrieved from http://www.ietf.org/rfc/rfc2543.txt.*

*Primary Examiner*—Larry Donaghue
*Assistant Examiner*—Nicholas Taylor
(74) *Attorney, Agent, or Firm*—Law Offices of Bradley J. Bereznak

(57) ABSTRACT

A conferencing system includes a plurality of ports for network connection to endpoint devices of participants to a conference session. A mixer receives input audio streams from the endpoint devices and then outputs a mixed audio stream back to the endpoint devices. A processor runs a program that automatically downgrades one or more of the participants to the conference session from a full-duplex communication mode to a half-duplex communication mode in response to an event affecting allocation of conferencing resources, the conferencing resources including the ports.

4 Claims, 6 Drawing Sheets

U.S. PATENT DOCUMENTS

| | | |
|---|---|---|
| 6,744,785 B2 | 6/2004 | Robinett et al. |
| 6,771,644 B1 | 8/2004 | Brassil et al. |
| 6,771,657 B1 | 8/2004 | Elstermann |
| 6,775,247 B1 | 8/2004 | Shaffer et al. |
| 6,816,469 B1 | 11/2004 | Kung et al. |
| 6,876,734 B1 | 4/2005 | Summers et al. |
| 6,865,540 B1 | 8/2005 | Faber et al. |
| 6,925,068 B1 | 8/2005 | Stanwood et al. |
| 6,931,001 B2 | 8/2005 | Deng |
| 6,931,113 B2 | 8/2005 | Ortel |
| 6,937,569 B1 | 8/2005 | Sarkar et al. |
| 6,947,417 B2 | 9/2005 | Laursen et al. |
| 6,956,828 B2 | 10/2005 | Simard et al. |
| 6,959,075 B2 | 10/2005 | Cutaia et al. |
| 6,976,055 B1 | 12/2005 | Shaffer et al. |
| 6,989,856 B2 | 1/2006 | Firestone et al. |
| 7,003,086 B1 | 2/2006 | Shaffer et al. |
| 7,007,098 B1 | 2/2006 | Smyth et al. |
| 7,084,898 B1 | 8/2006 | Firestone et al. |
| 2001/0000540 A1 | 4/2001 | Cooper et al. |
| 2002/0052214 A1* | 5/2002 | Maggenti et al. ............ 455/517 |
| 2002/0087976 A1 | 7/2002 | Kaplan et al. |
| 2003/0016632 A1* | 1/2003 | Refai et al. ................. 370/260 |
| 2003/0076850 A1 | 4/2003 | Jason, Jr. |
| 2003/0198195 A1 | 10/2003 | Li |
| 2004/0057449 A1* | 3/2004 | Black ........................ 370/432 |
| 2004/0165710 A1 | 8/2004 | DelHoyo et al. |
| 2004/0213152 A1 | 10/2004 | Matuoka et al. |
| 2005/0069102 A1 | 3/2005 | Chang |
| 2005/0078171 A1 | 4/2005 | Firestone et al. |
| 2005/0081244 A1 | 4/2005 | Barrett et al. |
| 2006/0020995 A1 | 1/2006 | Opie et al. |
| 2006/0189337 A1* | 8/2006 | Farrill et al. ................ 455/518 |
| 2007/0110029 A1* | 5/2007 | Gilmore et al. ............. 370/352 |
| 2007/0123284 A1* | 5/2007 | Schliwa-Bertling et al. . 455/518 |
| 2007/0133435 A1* | 6/2007 | Eneroth et al. .............. 370/260 |

* cited by examiner

SYSTEM AND METHOD FOR DYNAMICALLY UPGRADING / DOWNGRADING A CONFERENCE SESSION

FIELD OF THE INVENTION

The present invention relates generally to the fields of data networks and communication systems; more specifically, to systems and methods aimed at enabling and managing conference sessions among at least two endpoints in a communications system.

BACKGROUND OF THE INVENTION

Push-to-talk (PTT) is a two-way communication service that works like a walkie-talkie. A normal cell phone call is full-duplex, meaning both parties can hear each other at the same time. PTT is half-duplex, meaning communication can only travel in one direction at any given moment. A token-based model of operation, in which a person must be first granted access to the floor by a floor control mechanism before he may speak to other session participants, typically governs most PTT sessions. For instance, a PTT-enabled handset typically requires that a caller press and hold a button while talking, and then release the button when they are done. Any listener may then press their button in a similar manner to request access to the floor in order to respond.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

Figure 1:
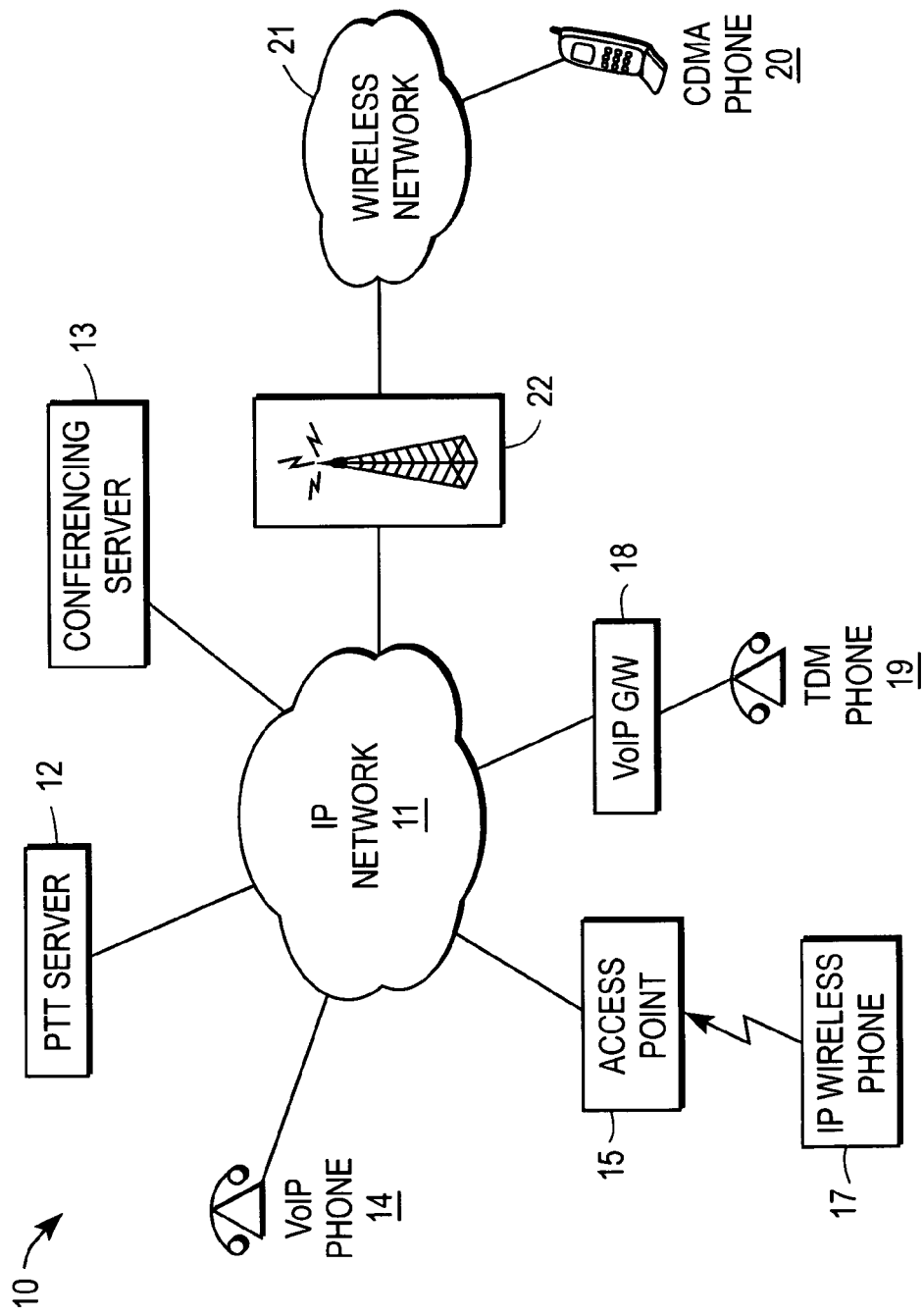
FIG. 1 is a high-level conceptual diagram of a conferencing system in accordance with one embodiment of the present invention.

A conferencing system and method for dynamically upgrading a PTT session to a full-duplex conference, as well as downgrading a full-duplex conference to a PTT conference, is described. In the following description specific details are set forth, such as device types, system configurations, protocols, methods, etc., in order to provide a thorough understanding of the present invention. However, persons having ordinary skill in the relevant arts will appreciate that these specific details may not be needed to practice the present invention.

According to one embodiment of the present invention, a conferencing system and method is provided in which all or some participants of a regular conference can either be downgraded to a PTT session, or upgraded from a PTT session to a full-duplex conferencing session. Downgrading/upgrading between half-duplex and full-duplex conferencing may be initiated by a processor running a program on the conferencing server, the conference moderator, or by a participant to the conference. A user interface may be utilized to initiate a downgrade/upgrade by a moderator or conference participant. For example, a graphical user interface (GUI), a touch user interface (TUI), or a voice user interface (VUI) may be used. For example, a VUI may utilize an interactive voice response (IVR) session initiated with the conference server win in the user presses a special key code, e.g., "#5", or, for IP phones, a "upgrade/downgrade" softkey button. In another embodiment, the system may utilize known speech recognition and/or natural language recognition techniques to initiate the mode transition.

System initiated downgrades may be initiated via a policy configured via a web based interface (e.g., a GUI). Various criteria may be applied for downgrading a user from full-duplex to PTT. For example, the downgrade of a conference participant to PTT may occur automatically based on the occurrence of an event or condition affecting conferencing resources, e.g., active speaker statistics, weighted priorities assigned to participants in the conference, or another conference of a higher priority vying for conferencing resources. In another embodiment, the system may attempt to reserve conferencing resources to allow new users to join the conference. As soon as the conference resources fall below a pre-configured threshold, the system moves full-duplex participants to half-duplex modality in order to free up conferencing resources. Depending on the particular policy being implemented, such automatic downgrades may be temporary, e.g., 10 minutes, or until conferencing resource availability permits the downgraded participants to be upgraded to a full-duplex conference. That is, after a predetermined time duration has elapsed, or upon release of resources (e.g., conferencing ports) the system may automatically upgrade the participant from PTT to full-duplex.

In another embodiment, a moderator can use a web-based GUI running on a PC to downgrade/upgrade a participant or conference to PTT mode. For instance, the GUI may list the entire set of participants in the conference along with their current communication mode (full duplex, PTT). When the moderator selecting PTT mode for a given participant, the GUI outputs a signal via an external interface of the PC to a conferencing server that causes the server to immediately change the communication channel of that participant from full-duplex to PTT. Likewise, a moderator can upgrade a PTT user to a regular conference by selecting the full-duplex setting for that participant. Note that in this latter case, upgrading is dependent upon the conferencing system having enough resources available.

If there are insufficient resources available at the time that the change is requested by the moderator, the participant will remain in PTT mode, and a message such as, "Cannot upgrade—system has no resources" may appear on the interface. In this latter instance, the system may provide the moderator with the option of "camping-on" the system to request or reserve the needed resources once they become available. Once the resources are available, the participant is automatically upgraded from PTT to full-duplex mode, with the moderator's GUI being updated accordingly. In another embodiment the system may advise the moderator that in order to facilitate the transition of the conference from half-duplex to full-duplex a certain number of participants would need to be dropped out from the conference.

Participant initiated mode changes may be implemented in a similar manner to that of moderator-initiated upgrades/downgrades. For example, a GUI may list the current modality and permit the user/participant to switch modalities, i.e., from PTT to full-duplex, or vice versa. The GUI may be generated by software (i.e., code) running the user's PC. In other cases, the GUI may comprise a collaborative web-based application that is accessed by the browser software running on the user's PC. In other instances, GUI 13 may comprise a downloaded application, or other forms of computer-executable code that may be loaded or accessed by a participant's PC.

As in the case of a moderator-initiated upgrade, a participant may only be permitted to upgrade to PTT mode if there are adequate resources available. If not, the user may have the option to camp-on the system until the required resources are available for his use.

A participant who has been downgraded/upgraded may be informed via an audio prompt or a text message sent to their endpoint device. The audio prompt may comprise special tone (e.g., two short "beep" tones for upgrade, one long beep for downgrade) or a pre-recorded message indicating that he has been downgraded to PTT, or upgraded to Full Duplex mode, whichever the case might be. For downgraded users, the message may also include a brief reason why the person was moved to PTT (e.g., "You have been downgraded due to insufficient conferencing resources."). Depending on the capabilities of the endpoint devices being used, other conference participants may also be notified of the change in status of those who have been upgraded/downgraded.

It is appreciated that the media path for the conference participants may include audio (voice) transmissions across a variety of different networks (e.g., Internet, intranet, PSTN, etc.), protocols (e.g., IP, Asynchronous Transfer Mode (ATM), Point-to-Point Protocol (PPP)), with connections that span across multiple services, systems, and devices (e.g., private branch exchange (PBX) systems, VoIP gateways, etc.). In a specific embodiment, the present invention may be implemented by software or hardware (firmware) installed in an IP communications system that includes components such as Cisco System's IP Communicator, Call Manager, MeetingPlace, Softphone (a PC that has phone capabilities installed), and other IP phone/communication products. Alternative embodiments of the present invention may be implemented in PBX, telephony, telephone, and other telecommunications systems.

FIG. 1 is an exemplary conferencing system 10 in accordance with one embodiment of the present invention that includes a PTT server 12 and a conferencing server 13 coupled via an IP network 11. IP network 11 may comprise a publicly accessible service provider network (Internet), or private network of a large enterprise. Similarly, PTT server 12 may be provided by a service provider or be included within a large enterprise organization. PTT server 11 supports a group of PTT (half-duplex) communications services and handles call control signaling among the plurality of PTT endpoints. Call routing to PTT server 11 may be accomplished using ordinary network layer IP protocols, such as the InterSwitching System Interface (ISSI) protocol.

Conferencing server 13 is responsible for providing the resources necessary to conduct the conference session. Typically, conferencing server 13 includes a digital signal processor (DSP) that mixes audio streams received from each of the conference participants—including the PTT speaker with the floor control token—with the mixed stream being output back to the conference participants and also the PTT users who are in listen-only mode (i.e., without the floor control token).

Conference participants may be connected to conferencing server 13 via IP network 11 through a variety of communication devices. For example, FIG. 1 shows a code-division multiple access (CDMA) digital cellular telephone 20 connected to IP network 11 via a wireless network 21 and a wireless gateway 22. (It is appreciated that the CDMA technology is presented only as example; other cellular technologies including IP over wireless and cellular and G3 technologies may also be utilized.)

Also shown is a time-division multiplexing (TDM) phone 19 connected to IP network 11 via a VoIP gateway 18. A standard VoIP phone 14 is shown directly connected with IP network 11. Additionally, an IP wireless phone 17 is illustrated in FIG. 1 connected with IP network 11 via a network access point 15. Other devices, including PCs with softphone functionality, traditional analog phones, and a variety of half-duplex radio communication devices may also be used by participants to the conference session.

Practitioners in the arts will understand that PTT server 12 and conferencing server 13 shown in FIG. 1 may be implemented by hardware, firmware, or software component elements that implement the various functions described herein. Furthermore, PTT server 12 and conferencing server 13 may be integrated into a single logical unit or physical box to simplify the signaling between the PTT and conferencing functions.

Figure 2:
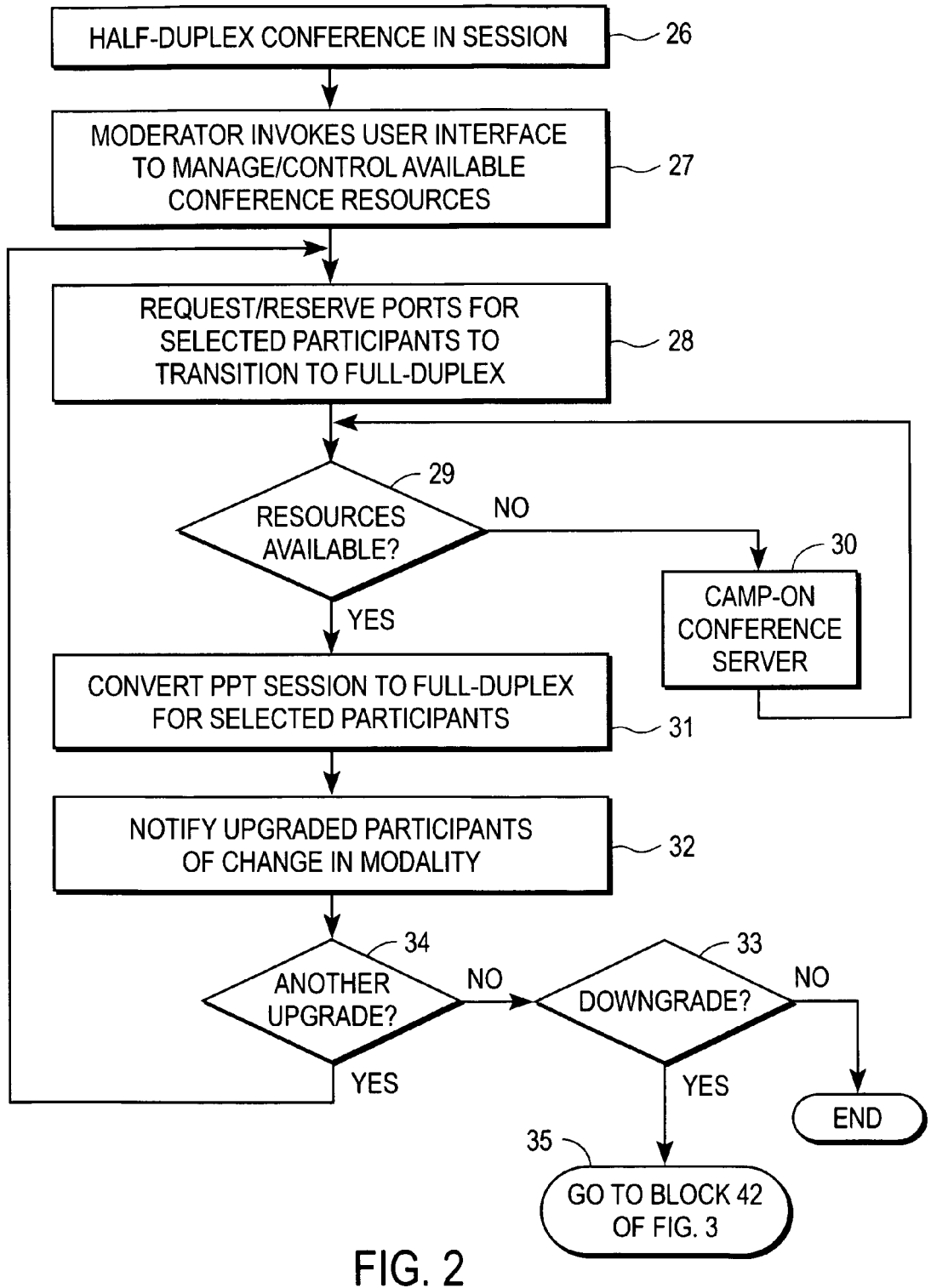
FIG. 2 is a flowchart diagram that illustrates a method of operation according to one embodiment of the present invention.

FIG. 2 is a flowchart diagram that illustrates an exemplary method of operation according to one embodiment of the present invention. The method shown in FIG. 2 involves upgrading from PTT to full-duplex a selected subset of the participants (or all of the participants) in a conference session. The process begins at a point where one or more participants are currently in a PTT mode (block 26), at which time the moderator invokes a user interface (e.g., GUI, TUI, or VUI) to selectively upgrade one or more participants to the conference session from PTT mode to full-duplex mode (block 27). Through the user interface, the moderator makes his selection and then submits the list of participants to the conferencing server as part of a request to transition those participants form PTT to full-duplex mode (block 28).

As previously discussed, a single conference server can support many conferences. Therefore, a request to upgrade one or more participants may not always be granted, since granting the request depends on the current network resource allocation. In response to the upgrade request, the conferencing server may run an algorithm to determine whether the session can be upgraded to full duplex mode for each of the participants selected (block 29). In the event that the there are insufficient resources available (e.g., no ports on the conferencing server or insufficient mixer resources) the conferencing server may be "camped-on" until there are sufficient ports available to convert the PTT conversations to full-duplex conference (block 30). Basically, the upgrade request stays with the conferencing server in the form of a reservation to use server resources are once they become available. Alternatively, the system may notify the moderator that a number of users should be converted to half-duplex communication mode in order to accommodate the request.

In a specific embodiment, a subset of the participants may hold onto the conference server ports while the rest of the conference participants are shifted to PTT mode. This hybrid scenario may be useful to keep key meeting participants in a full-duplex mode while temporarily downgrading the other participants are to a PTT session.

Continuing with the example of FIG. 2, if resources for the upgrade are presently available the server may immediately respond to the request and convert the designated participants from PTT mode to full duplex (block 31). Once upgraded, the other participants to the conference session may be notified of the change in modality, as discussed above (block 32). At this point in the process, the moderator, participants, or system may initiate another upgrade (block 34) or downgrade (block 33), with the latter process being described in more detail below in connection with FIG. 3 (block 35).

It should be understood that upgrading/downgrading participants can occur anytime during the conference session by either the moderator, the system (automatically, based on policy rules), or by the conference participants themselves, depending on the particular system configuration.

Figure 3:
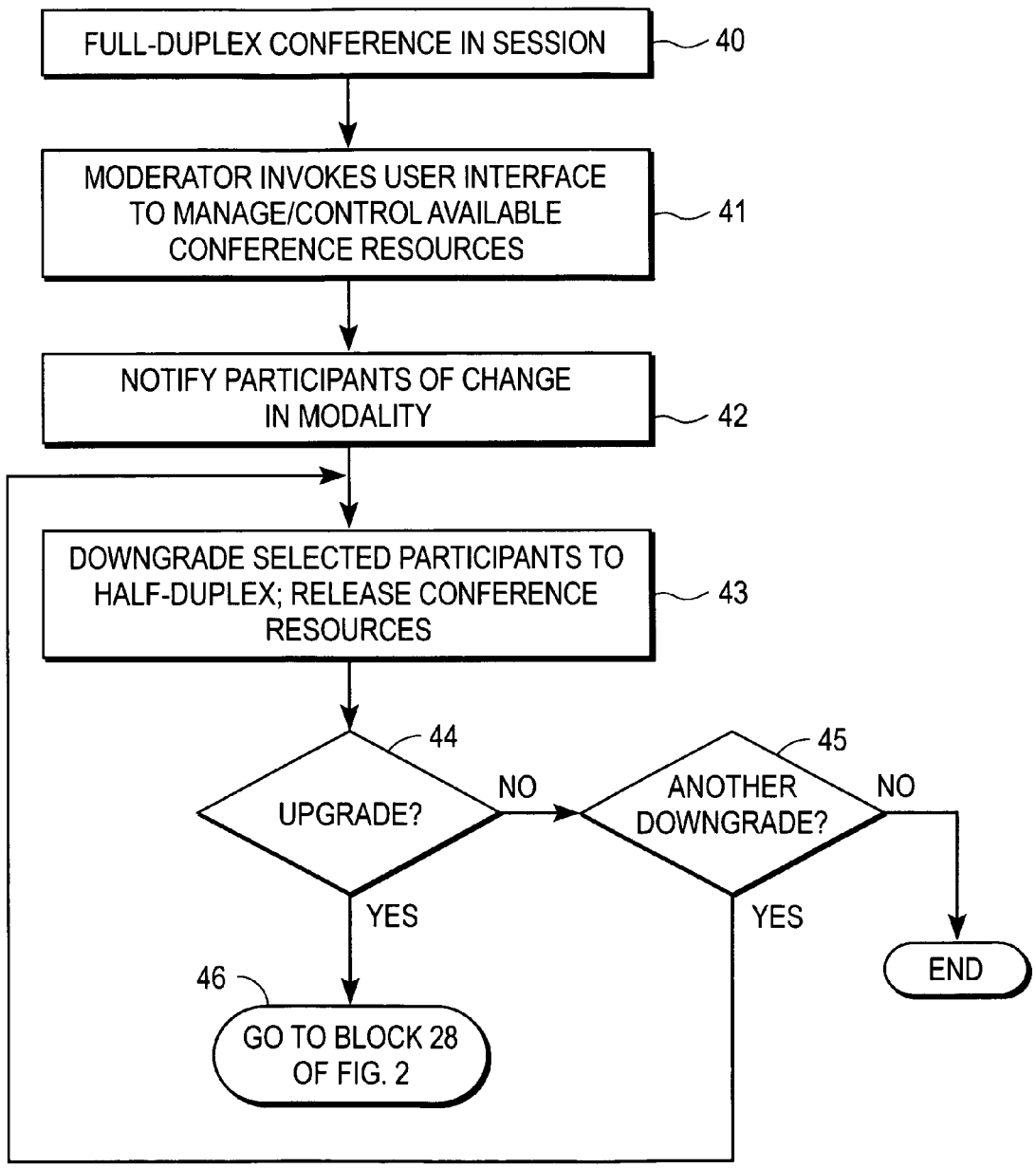
FIG. 3 is a flowchart diagram that illustrates a method of operation according to another embodiment of the present invention.

FIG. 3 is a flowchart diagram that illustrates another method of operation according to one embodiment of the present invention; specifically aimed at downgrading one or more participants from a full-duplex conference to PTT mode. Practitioners in the art will appreciate that downgrading may be performed either when a reservationless meeting is unable to be scheduled due to insufficient ports on the conference server, or where the moderator specifically selects individuals for downgrading.

By way of example, where discussions in a meeting begin to spin out of control a moderator may regain control by temporarily downgrading particularly vociferous individuals to PTT mode. Note that when downgrading participants to PTT mode a choice may be presented to the moderator (e.g., via a GUI) whether to hold the ports, in order to switch back to full duplex mode in the near future, or release them entirely. In a different scenario, the moderator may change the mode of communication of current participants from full-duplex to half-duplex mode to free up resources that may enable other users to join the meeting.

In FIG. 3, when a full duplex conference in session (block 40), a moderator may invoke a user interface for directing the conference server to downgrade a selected list of participants (or entire conference) to PTT mode (block 41). Immediately after the downgrade has occurred, the participants to the conference may be notified of the change in modality (block 42) using one or more of the various mechanisms described above. Once the selected participants have been downgraded to half-duplex mode, and the conference server resources allocated to those participants may be released for use elsewhere (block 43). Alternatively, in cases where the moderator expects to upgrade certain downgraded individuals at a later point in the conference session, the ports and other resources allocated for the downgraded participants may be reserved or held on to for predetermined time period. Later, if an upgrade (block 44) is initiated the process flow continues with the steps previously described in connection with FIG. 2 (block 46). If there are still participants to the full-duplex conference, another option at this point is to perform a further downgrade to PTT mode (block 45).

Figure 4:
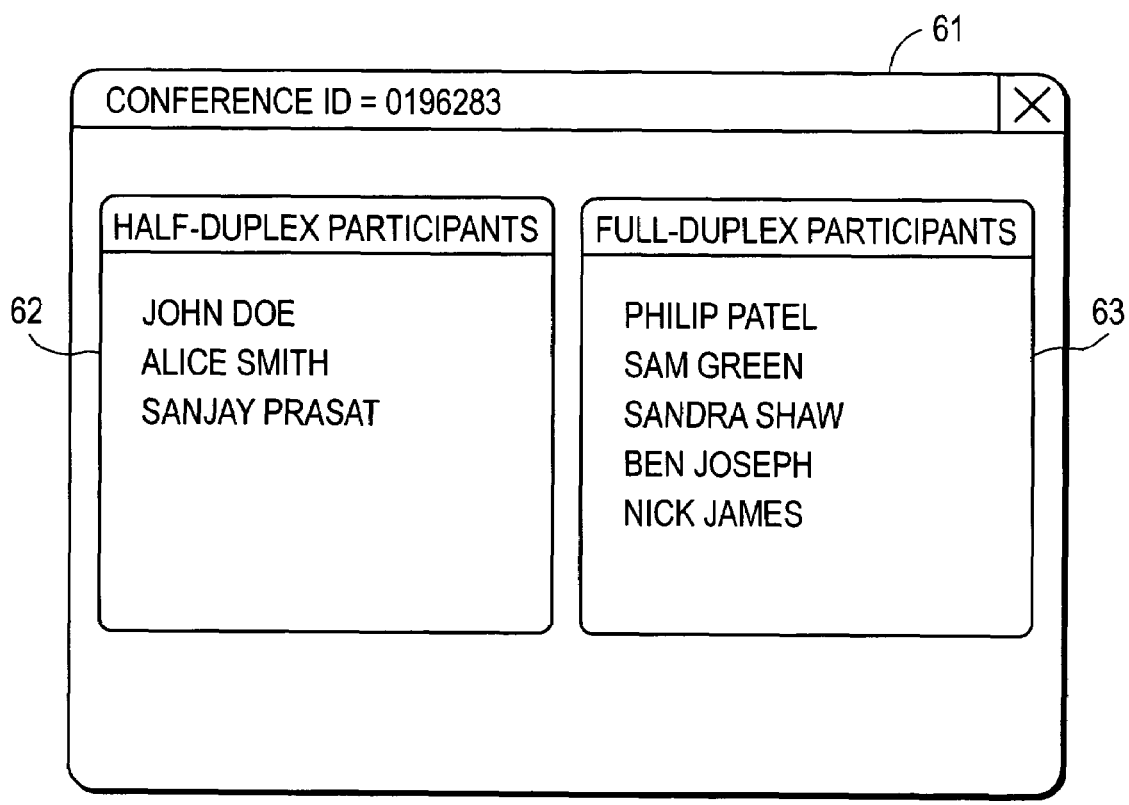
FIG. 4 illustrates a user interface window associated with an application running on a PC of a user in accordance with one embodiment of the present invention.

FIG. 4 is an example that illustrates a graphical user interface 61 associated with an application running on a PC of a moderator or participant in accordance with one embodiment of the present invention. As can be seen, GUI 61 includes respective display windows 62 and 63 that respectively list those participants currently in PTT (half duplex) and full-duplex conference mode. In this example, window 62 shows three participants (i.e., John Doe, Alice Smith and Sanjay Prasat) currently in PTT mode. The participants in the full-duplex conference (window 63) include five persons (i.e., Philip Patel, Sam Green, Sandra Shaw, Ben Joseph, and Nick James). According to one implementation, when the moderator wants to change the communication modality of any participant he may do so by clicking (i.e., selecting) on a participant's name and dragging that person to the other window. Alternatively, the moderator may "right-click" on the person's name to select a command that "flips" or switches their modality. In this latter case, switching the modality of a selected participant results in the user interface being immediately updated, i.e., that person's name is moved from one window (62 or 63) to the other window (63 or 62, respectively).

In yet another embodiment, a subset of the participants in the full-duplex conference may enter into a breakout or sidebar session, with the conferencing server automatically switching the sidebar participants into a PTT session. In another implementation, the sidebar session is created as a PTT session between the sidebar participants only in the event that the conferencing server no longer has available ports or other necessary resources for you full-duplex sidebar session. When the sidebar participants end their breakout session, they may be automatically returned to full-duplex mode, assuming, of course, that the necessary conferencing resources (e.g., ports) are still available.

Figure 5:
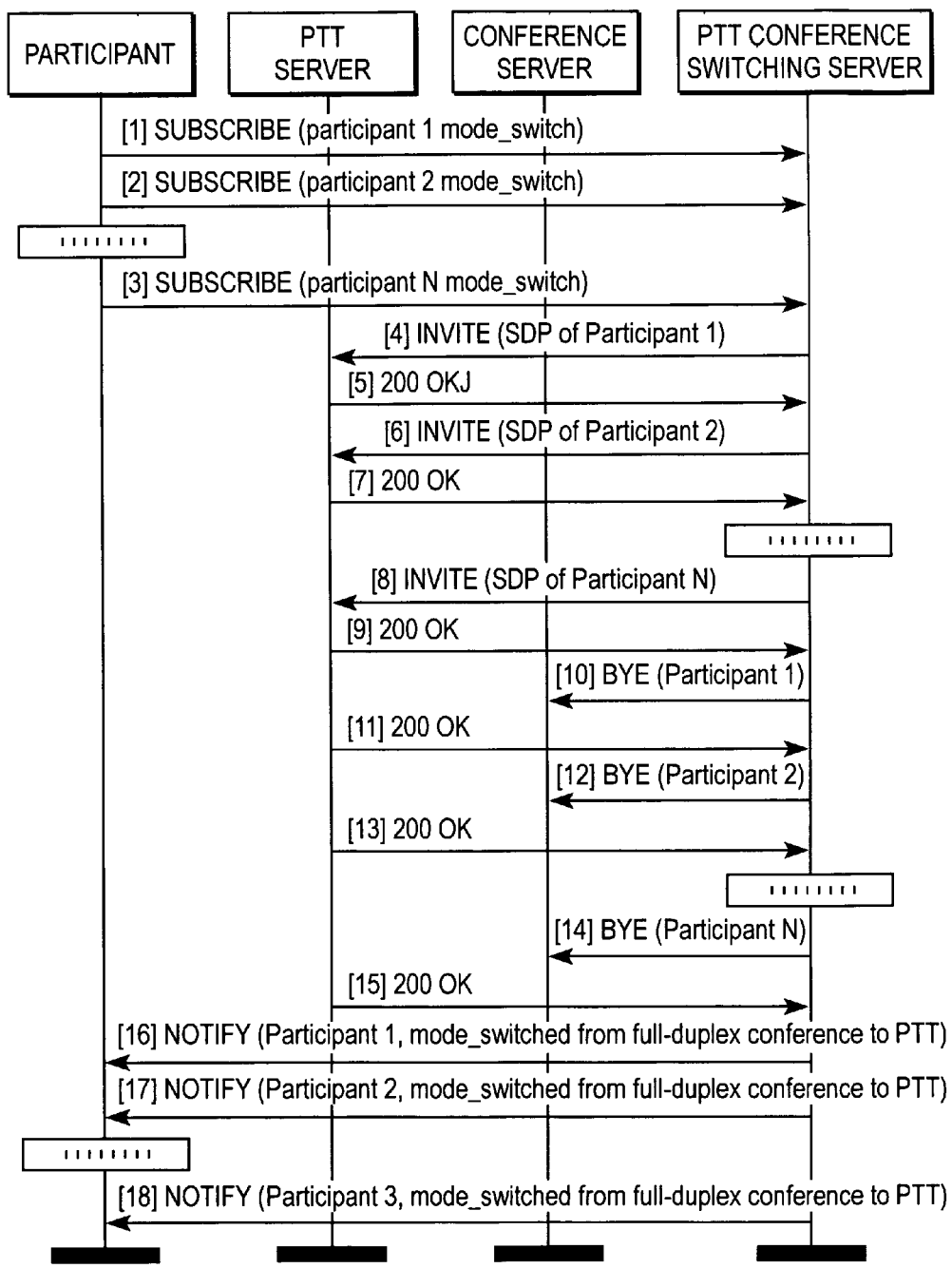
FIG. 5 is an exemplary call flow diagram in accordance with one embodiment of the present invention.

FIG. 5 is an exemplary call flow diagram in accordance with one embodiment of the present invention. The diagram of FIG. 5 illustrates the signaling that may occur between the PTT server and the conferencing server during an upgrade/downgrade change in modality. In this example, the Session Initiation Protocol (SIP) is utilized for the communications. Practitioners in the art will appreciate that the call flow diagram shows well-known logical elements and standard SIP messages. For example, the PTT server is a conventional device utilized for controlling the PTT floor, the Conferencing Server represents a full-duplex conference system, and the PTT conference Switch Server is the logical entity that performs the mode switch function between full-duplex and half-duplex. Participants to be switched from full-duplex to half-duplex, and vice-versa, basically subscribe to the mode switch event to the PTT conference Switch Server. Once this event is triggered, participants are moved from the Conference Server to the PTT server, or vice versa, depending upon the modality that is requested. The participants are also notified about the change in modality.

Figure 6:
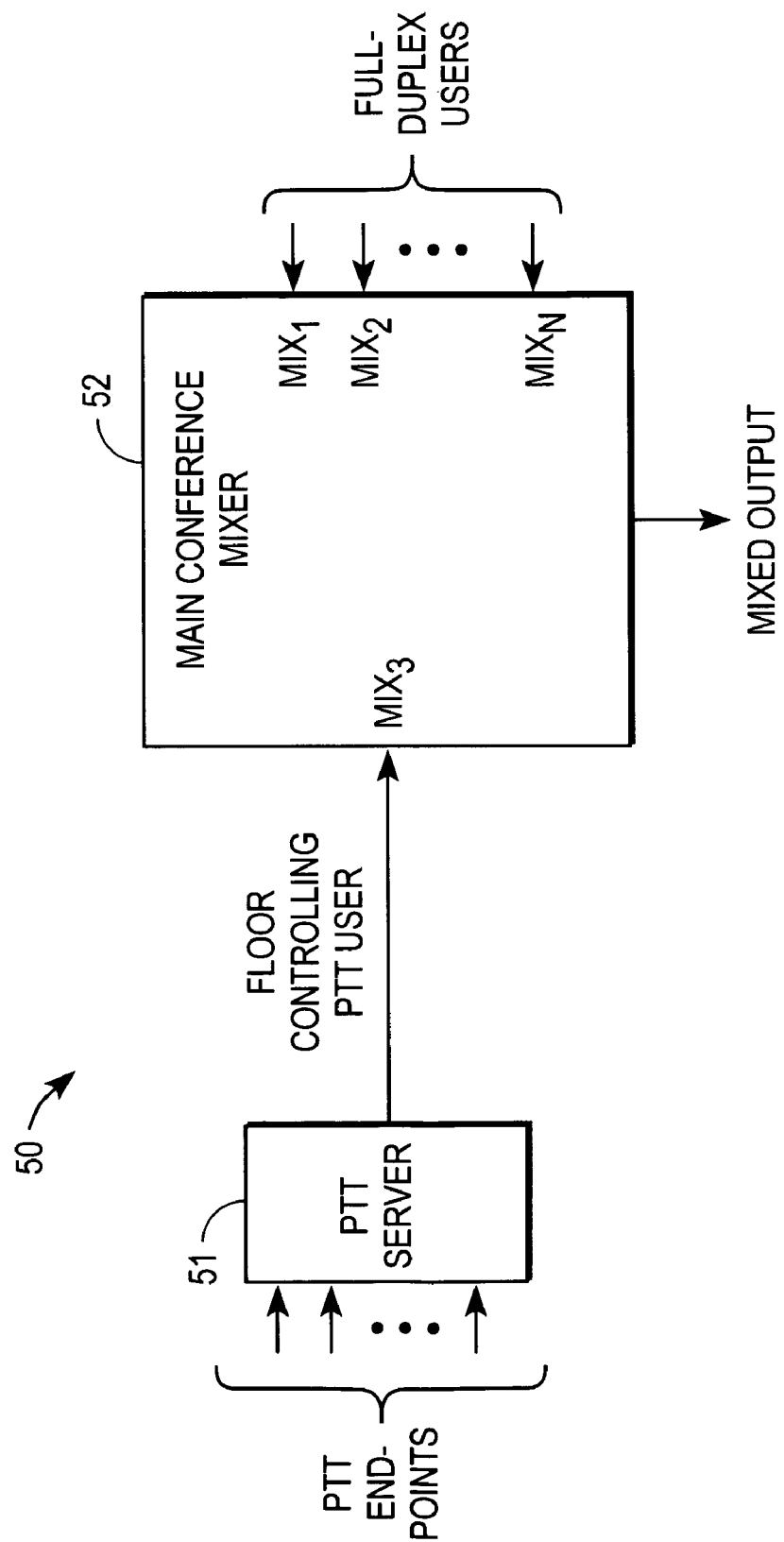
FIG. 6 is a block diagram that illustrates signaling in a configuration involving PTT endpoints and full-duplex users according to one embodiment of the present invention.

FIG. 6 is a block diagram that illustrates PTT floor control and conference mixing in accordance with one embodiment of the present invention. In FIG. 6, a PTT server 51 is shown supporting a plurality of PTT endpoints and operating in accordance with an algorithm that grants the floor (i.e., the token to speak) to one PTT user at any given time. That PTT user may then speak in the main conference via a reserved slot or port (e.g., $MIX_3$) of a main conference mixer 52. Regular (i.e. full-duplex) users who may participate in the conference session are shown coupled with reserved slots $MIX_1$, $MIX_2$, $MIX_4$ ... $MIX_N$. The audio streams received from the regular users and the floor controlling PTT user are mixed according to a mixing algorithm (e.g., mix only the three loudest speakers at any give time). The mixed audio stream is then output to the conference session participants (all PTT users, except the PTT user who has the floor and is speaking, and all regular users).

It is appreciated that a variety of token-based floor control algorithms or paradigms may be applied to the entire conference in order to improve the experience of the PTT speaker to the conference session. For example, whenever a PTT user wants to say something to all of the conference participants, he first gains access to the floor via the floor control algorithm running on the PTT server. At the point where an audio stream arrives at a slot or port of the mixer of the conferencing server, that event may trigger a transition in the conferencing server wherein a token-based scheme is imposed on the regular conference participants. In other words, only one person may be allowed to speak at a time. In this way, a PTT speaker does not miss out on any other discussions that might otherwise occur while he is speaking.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method comprising:
 during a conference session in a full-duplex communication mode, receiving input to downgrade one or more of the participants to the conference session to a half-duplex communication mode, the input being generated automatically via a policy configured on a web-based interface, the policy comprising occurrence of an event affecting conferencing resources;
 according to the input, downgrading one or more of the participants to the conference session to the half-duplex communication mode;
 providing a moderator of the conference session with an option to reserve the conferencing resources upon passing of the event or release of the conferencing resources;
 following selection of the option by the moderator, automatically upgrading the one or more participants to the full-duplex communication mode upon passing of the event or release of the conferencing resources.

2. The method of claim 1, wherein a mixer supports the conference session in the full-duplex communication mode and a push-to-talk (PTT) switch supports the portion of the conference session in the half-duplex communication mode, a single server comprising both the PTT switch and the mixer.

3. The method of claim 1, wherein a mixer supports the conference session in the full-duplex communication mode and a push-to-talk (PTT) switch supports the portion of the conference session in the half-duplex communication mode, a first server comprising the PTT switch and a second server comprising the mixer.

4. The method of claim 3, further comprising initiating a Session Initiation Protocol (SIP) call flow to downgrade to the half-duplex communication mode.

* * * * *